United States Patent
Yang et al.

(10) Patent No.: US 11,710,872 B2
(45) Date of Patent: Jul. 25, 2023

(54) BATTERY CELL, BATTERY, POWER CONSUMPTION DEVICE AND MANUFACTURING DEVICE AND METHOD FOR BATTERY CELL

(71) Applicant: CONTEMPORARY AMPEREX TECHNOLOGY CO., LIMITED, Ningde (CN)

(72) Inventors: Jianxiong Yang, Ningde (CN); Siying Huang, Ningde (CN); Jinmei Xu, Ningde (CN); Haizu Jin, Ningde (CN); Zhijun Guo, Ningde (CN); Linggang Zhou, Ningde (CN); Jiandong Yang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/892,646

(22) Filed: Aug. 22, 2022

(65) Prior Publication Data

US 2022/0416335 A1    Dec. 29, 2022

Related U.S. Application Data

(63) Continuation of application No. PCT/CN2021/076487, filed on Feb. 10, 2021.

(51) Int. Cl.
*H01M 50/15* (2021.01)
*H01M 50/586* (2021.01)
(Continued)

(52) U.S. Cl.
CPC ......... *H01M 50/15* (2021.01); *H01M 50/103* (2021.01); *H01M 50/533* (2021.01);
(Continued)

(58) Field of Classification Search
CPC .. H01M 50/15; H01M 50/586; H01M 50/533; H01M 50/103; H01M 50/55; H01M 50/593
See application file for complete search history.

(56) References Cited

U.S. PATENT DOCUMENTS

2013/0323574 A1* 12/2013 Tsunaki ............. H01M 50/176
                                                       429/158
2014/0087242 A1*  3/2014 Takashiro .......... H01M 50/184
                                                       429/179
(Continued)

FOREIGN PATENT DOCUMENTS

CN    111029488 A    4/2020
CN    211017134 U    7/2020
(Continued)

OTHER PUBLICATIONS

International Search Report dated May 6, 2021 issued in PCT/CN2021/076487.
Written Opinion dated May 6, 2021 issued in PCT/CN2021/076487.

*Primary Examiner* — Jonathan G Jelsma
(74) *Attorney, Agent, or Firm* — Scully, Scott, Murphy & Presser, P.C.

(57) ABSTRACT

An embodiment of the present application provides a battery cell, a battery, a power consumption device, and a manufacturing device and method for a battery cell. The battery cell includes a housing, an electrode assembly, an end cover assembly and a current collecting member. The electrode assembly is accommodated in the housing, and the electrode assembly includes a tab. The end cover assembly includes an end cover, an electrode terminal and an insulating member, the end cover is used to cover at an opening of the housing, the electrode terminal is mounted to the end cover, and the insulating member is located on one side of the end cover facing the electrode assembly. The current collecting mem- (Continued)

ber is used to connect the electrode terminal and the tab. This structure can make more space for the electrode assembly and can effectively increase the capacity of the battery cell.

19 Claims, 10 Drawing Sheets

(51) Int. Cl.
    *H01M 50/533* (2021.01)
    *H01M 50/103* (2021.01)
    *H01M 50/55* (2021.01)
    *H01M 50/593* (2021.01)

(52) U.S. Cl.
    CPC ......... *H01M 50/55* (2021.01); *H01M 50/586* (2021.01); *H01M 50/593* (2021.01); *H01M 2220/20* (2013.01)

(56) References Cited

U.S. PATENT DOCUMENTS

| | | | |
|---|---|---|---|
| 2015/0017501 A1* | 1/2015 | Harayama | H01M 50/176 |
| | | | 429/158 |
| 2016/0056445 A1* | 2/2016 | Minagata | H01M 10/0413 |
| | | | 429/153 |
| 2020/0212407 A1 | 7/2020 | Chen et al. | |
| 2020/0251711 A1 | 8/2020 | Wakimoto et al. | |
| 2021/0036299 A1* | 2/2021 | Maeda | H01M 50/55 |

FOREIGN PATENT DOCUMENTS

| | | |
|---|---|---|
| CN | 211629211 U | 10/2020 |
| EP | 3675203 A1 | 7/2020 |

\* cited by examiner

BATTERY CELL, BATTERY, POWER CONSUMPTION DEVICE AND MANUFACTURING DEVICE AND METHOD FOR BATTERY CELL

CROSS-REFERENCE TO RELATED APPLICATIONS

This application is a continuation of International Application No. PCT/CN2021/076487, filed on Feb. 10, 2021, the disclosure of which is hereby incorporated by reference in its entirety.

TECHNICAL FIELD

The present application relates to the technical field of batteries, and in particular, to a battery cell, a battery, and a power consumption device, and a manufacturing device and method for the battery cell.

BACKGROUND

Currently, the most commonly used batteries in vehicles are lithium-ion batteries. As a rechargeable battery, lithium-ion batteries have the advantages of small size, high energy density, high power density, multiple recycle times, and long storage time.

The rechargeable battery includes a housing, an end cover assembly and an electrode assembly. The electrode assembly is located in the housing, and the end cover assembly covers at the housing, so as to provide a sealed environment for the electrode assembly.

For a general rechargeable battery, the capacity of the battery cell is limited by the structure of the end cover assembly, which in turn affects the capacity of the battery cell.

Therefore, how to improve the capacity of the battery cell is an urgent technical problem to be solved in the battery technology.

SUMMARY

Embodiments of the present application provide a battery cell, a battery, a power consumption device, and a manufacturing device and method for a battery cell, which can effectively improve the capacity of the battery cell.

A first aspect of the embodiments of the present application provides a battery cell, including: a housing, with an opening; an electrode assembly, being accommodated in the housing, the electrode assembly including a tab; an end cover assembly, including an end cover, an electrode terminal and an insulating member, the end cover being used to cover at the opening, the electrode terminal being mounted to the end cover, the insulating member located on one side of the end cover facing the electrode assembly; and a current collecting member, for connecting the electrode terminal and the tab, so that the tab is electrically connected to the electrode terminal; where a first concave portion is formed on one side of the insulating member facing the electrode assembly, and the first concave portion is configured to accommodate at least a part of the tab and/or at least a part of the current collecting member, a first convex portion is formed on one side of the insulating member facing away from the electrode assembly at a position corresponding to the first concave portion, a second concave portion is formed on the side of the end cover facing the electrode assembly, and the second concave portion is used for accommodating the first convex portion.

In the above solution, the first concave portion is formed on the side of the insulating member facing the electrode assembly, and the first concave portion can accommodate at least a part of the tab and/or at least a part of the current collecting member, which can make more space for the electrode assembly. The first convex portion is formed on the side of the insulating member facing away from the electrode assembly at the position corresponding to the first concave portion. On the one hand, the first convex portion can act as a reinforcement at the position where the first concave portion is provided on the insulating member, on the other hand, the arrangement of the first convex portion can make the first concave portion be recessed as much as possible in the direction facing away from the electrode assembly, so as to increase the recess depth of the first concave portion. In addition, the second concave portion is formed on the side of the end cover facing the electrode assembly, and the first convex portion is accommodated in the second concave portion, which reduces the space inside the housing occupied by the insulating member, and further makes more space for the electrode assembly, thereby effectively increasing the capacity of battery cell.

In some embodiments, the end cover includes a first body, the first body being used to cover at the opening; the first body has a first inner surface facing the electrode assembly, and the second concave portion is recessed from the first inner surface along a direction facing away from the electrode assembly.

In the above solution, the end cover includes the first body for covering the opening of the housing, and the second concave portion is recessed outwards from the first inner surface of the first body. The end cover of this structure has a simple structure and is easy to be molded and manufactured.

In some embodiments, the end cover further includes a second convex portion; the first body further has a first outer surface provided opposite to the first inner surface, and the second convex portion is protrudingly provided on the first outer surface and is located at a position corresponding to the second concave portion.

In the above solution, the first outer surface of the first body is provided with the second convex portion at the position corresponding to the second concave portion, the second convex portion can strengthen the position where the second concave portion is provided on the first body, which improve the firmness of the end cover.

In some embodiments, the second convex portion has a first end surface, the second convex portion extends to the first end surface from the first outer surface along the direction facing away from the electrode assembly, and the first end surface does not exceed the electrode terminal in the direction facing away from the electrode assembly.

In the above solution, the first end surface of the second convex portion does not exceed the electrode terminal in the direction facing away from the electrode assembly, and the second convex portion reasonably utilizes the space between the first outer surface of the first body and an end portion of the electrode terminal.

In some embodiments, the second concave portion has a first bottom wall, the second concave portion is recessed to the first bottom wall from the first inner surface along the direction facing away from the electrode assembly, and the first bottom wall exceeds the first outer surface along the direction facing away from the electrode assembly.

In the above solution, the first bottom wall of the second concave portion exceeds the first outer surface along the direction facing away from the electrode assembly, so that the second concave portion is recessed to the second convex portion, thereby increasing the recess depth of the second concave portion and increasing the space of the second concave portion for accommodating the first convex portion, so that the first convex portion can extend to a deeper position of the second concave portion.

In some embodiments, the insulating member includes a second body and the first convex portion; the second body has a second inner surface and a second outer surface opposite to each other, the second inner surface faces the electrode assembly, the first concave portion is recessed from the second inner surface along the direction facing away from the electrode assembly, and the first convex portion is protrudingly provided on the second outer surface.

In the above solution, the first convex portion is protrudingly provided on the second outer surface of the second body, and the first concave portion is recessed from the second inner surface of the second body along the direction facing away from the electrode assembly. The insulating member of this structure has a simple structure and is easy to be molded and manufactured.

In some embodiments, the second outer surface abuts against the first inner surface.

In the above solution, the second outer surface of the second body abuts against the first inner surface of the first body, so that the first convex portion may be completely accommodated in the first concave portion, which can make more space for the electrode assembly.

In some embodiments, the first convex portion has a second end surface, the first convex portion extends to the second end surface from the second outer surface along the direction facing away from the electrode assembly; the second concave portion has a first bottom wall, the second concave portion is recessed to the first bottom wall from the first inner surface along the direction facing away from the electrode assembly; where a gap is presented between the second end surface and the first bottom wall.

In the above solution, the gap is presented between the second end surface of the first convex portion and the first bottom wall of the second concave portion, to ensure that the second outer surface of the second body may effectively abut against the first inner surface of the first body, which reduces a risk of over-positioning between the insulating member and the end cover.

In some embodiments, the first concave portion has a second bottom wall, the first concave portion is recessed to the second bottom wall from the second inner surface along the direction facing away from the electrode assembly, and the second bottom wall exceeds the second outer surface along the direction facing away from the electrode assembly.

In the above solution, the second bottom wall of the first concave portion exceeds the second outer surface along the direction facing away from the electrode assembly, so that the first concave portion is recessed to the first convex portion, thereby increasing the recess depth of the first concave portion and increasing the space of the first concave portion for accommodating the tab and/or the current collecting member, the tab and/or the current collecting member can be extended to a deeper position of the first concave portion, so as to make more space for the electrode assembly.

In some embodiments, the end cover includes a first body and a third convex portion, the first body being used to cover at the opening; the first body has a first inner surface facing the electrode assembly, the third convex portion has a third end surface, and the third convex portion extends to the third end surface from the first inner surface along a direction facing the electrode assembly; and the second concave portion is recessed to the first inner surface from the third end surface along the direction facing away from the electrode assembly.

In the above solution, by providing the third convex portion on the first inner surface of the first body, the end cover forms the second concave portion on the side facing the electrode assembly, and the structure is simple.

In some embodiments, the first body further has a first outer surface provided opposite to the first inner surface; a third concave portion recessed from the first outer surface along the direction facing the electrode assembly is formed on one side of the first body facing away from the electrode assembly at a position corresponding to the third convex portion, the third concave portion is configured to accommodate at least a part of the electrode terminal.

In the above solution, the third concave portion recessed from the first outer surface along the direction facing the electrode assembly is formed on the side of the first body facing away from the electrode assembly, and the third concave portion may be used to accommodate at least a part of the electrode terminal, so as to shorten the length of the part of the electrode terminal protruding from the first body. In addition, since the third concave portion is arranged at the position of the first body corresponding to the third convex portion, the third convex portion can make the third concave portion recess as much as possible along the direction facing the electrode assembly, which further shortens the length of the part of the electrode terminal protruding from the first body.

In some embodiments, the third concave portion has a third bottom wall, the third concave portion is recessed to the third bottom wall from the first outer surface along the direction facing the electrode assembly; and the third bottom wall exceeds the first inner surface along the direction facing the electrode assembly.

In the above solution, the third bottom wall of the third concave portion exceeds the first inner surface along the direction facing the electrode assembly, so that the third concave portion is recessed to the third convex portion, thereby increasing the recess depth of the third concave portion and increasing the space of the third concave portion for accommodating the electrode terminal, so that the electrode terminal can be mounted at a deeper position of the third concave portion.

In some embodiments, the first convex portion and the second concave portion form a positioning engagement.

In the above solution, the first concave portion and the second concave portion form the positioning engagement, which can restrict the insulating member from moving relative to the end cover in the direction perpendicular to the thickness direction of the end cover. When assembling the insulating member and the end cover, inserting the first convex portion into the second concave portion can realize the positioning of the insulating member and the end cover, so as to realize the accurate and rapid assembly of the insulating member and the end cover.

In some embodiments, the electrode assembly abuts against the insulating member along the direction facing away from the electrode assembly.

In the above solution, the electrode assembly abuts against the insulating member along the direction facing the end cover, so that the electrode assembly and the insulating member are more compact, which is beneficial to increase the capacity of the battery cell.

In some embodiments, the tab includes a first connection portion, the current collecting member includes a second connection portion for connecting to the first connection portion; and the first concave portion is configured to accommodate at least a part of the first connection portion and/or at least a part of the second connection portion.

In the above solution, the first connection portion is the part where the tab connects to the current collecting member, the second connection portion is the part there the current collecting member connects to the tab, at least a part of the first connection portion of the tab and/or at least a part of the second connection portion of the current collecting member are accommodated in the first concave portion, which can make more space for the electrode assembly, thereby effectively increasing the capacity of the battery cell.

In some embodiments, the first connection portion and the second connection portion are laminated and distributed in a thickness direction of the end cover.

In the above solution, the first connection portion and the second connection portion are laminated and distributed in the thickness direction of the end cover, which is convenient for connecting the first connection portion and the second connection portion together.

In some embodiments, the first connection portion and the second connection portion are both accommodated in the first concave portion.

In the above solution, the first connection portion and the second connection portion are both accommodated in the first concave portion, which further makes more space for the electrode assembly.

In some embodiments, the current collecting member further includes a third connection portion for connecting to the electrode terminal, and the third connection portion and the second connection portion are spaced part in the thickness direction of the end cover.

In the above solution, the third connection portion and the second connection portion are spaced part in the thickness direction of the end cover, which is convenient for accommodating the second connection portion in the first concave portion.

In some embodiments, the electrode terminal is staggered from the second concave portion in a preset direction, and the preset direction is perpendicular to the thickness direction of the end cover.

In the above solution, the electrode terminal is staggered from the second concave portion in the direction perpendicular to the thickness direction of the end cover, so that the second concave portion is formed outside the area where the end cover is mounted with the electrode terminal, and the arrangement of the second concave portion will not affect the mounting of the electrode terminal.

In some embodiments, the end cover assembly includes the two electrode terminals spaced apart along the preset direction; and the second concave portion is located between the two electrode terminals in the preset direction.

In the above solution, the second concave portion is located between the two electrode terminals in the preset direction, that is, the second concave portion is arranged in the area of the end cover between the two electrode terminals, and the space of the end cover between the two electrode terminals is reasonably used.

A second aspect of the embodiments of the present application provides a battery, including the battery cell according to any one of the embodiments of the above first aspect; and the battery cell being accommodated in the box body.

A third aspect of the embodiments of the present application provides a power consumption device, including the battery according to any one of the embodiments of the above second aspect.

A fourth aspect of the embodiments of the present application provides a manufacturing method for a battery cell, including: providing a housing, the housing having an opening; providing an electrode assembly, the electrode assembly including a tab; providing an end cover assembly, the end cover assembly including an end cover, an electrode terminal and an insulating member, the electrode terminal being mounted to the end cover; providing a current collecting member; accommodating the electrode assembly in the housing; connecting the current collecting member to the electrode terminal and the tab, so that the tab is electrically connected to the electrode terminal; covering the end cover at the opening; where the insulating member is located on one side of the end cover facing the electrode assembly, a first concave portion is formed on one side of the insulating member facing the electrode assembly, and the first concave portion is configured to accommodate the at least a part of the tab and/or the at least a part of the current collecting member, a first convex portion is formed on one side of the insulating member facing away from the electrode assembly at a position corresponding to the first concave portion, a second concave portion is formed on the side of the end cover facing the electrode assembly, and the second concave portion is used to accommodate the first convex portion.

A fifth aspect of the embodiments of the present application provides a manufacturing device for a battery cell, including: a first providing apparatus, for providing a housing, the housing having an opening; a second providing apparatus, for providing an electrode assembly, the electrode assembly including a tab; a third providing apparatus, for providing an end cover assembly, the end cover assembly including an end cover, an electrode terminal and an insulating member, the electrode terminal being mounted to the end cover; a fourth providing apparatus, for providing a current collecting member; and an assembling apparatus, for accommodating the electrode assembly in the housing, the assembling apparatus being used for connecting the current collecting member to the electrode terminal and the tab, so that the tab and the electrode terminal are electrically connected, and the assembling apparatus being further used to cover the end cover at the opening; where the insulating member is located on one side of the end cover facing the electrode assembly, a first concave portion is formed on one side of the insulating member facing the electrode assembly, and the first concave portion is configured to accommodate the at least a part of the tab and/or the at least a part of the current collecting member, a first convex portion is formed on one side of the insulating member facing away from the electrode assembly at a position corresponding to the first concave portion, a second concave portion is formed on the side of the end cover facing the electrode assembly, and the second concave portion is used to accommodate the first convex portion.

BRIEF DESCRIPTION OF DRAWINGS

To describe the technical solutions in embodiments of the present application more clearly, the following briefly describes the accompanying drawings required for the embodiments. Apparently, the accompanying drawings in the following description show merely some embodiments of the present application, and persons of ordinary skill in the art may still derive other drawings from these accompanying drawings without creative efforts.

Figure 1:
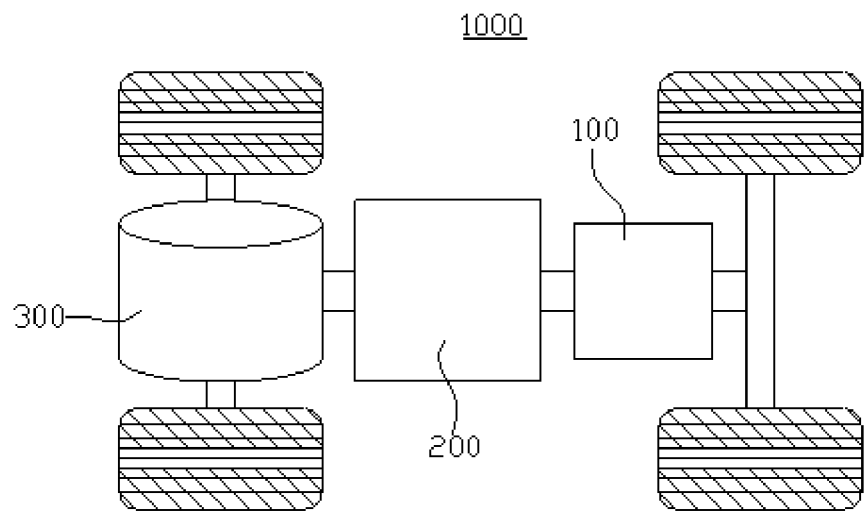
FIG. 1 is a schematic structural diagram of a vehicle provided by some embodiments of the present application.

Description of signs: 10—box body; 11—accommodating space; 12—first portion; 13—second portion; 20—battery cell; 21—housing; 22—electrode assembly; 221—tab; 2211—first connection portion; 222—positive electrode plate; 223—negative electrode plate; 224—separator; 23—end cover assembly; 231—end cover; 2311—second concave portion; 2313a—first bottom wall; 2312—electrode extraction hole; 2313—first body; 2313a—first inner surface; 2313b—first outer surface; 2314—second convex portion; 2314a—first end surface; 2315—third convex portion; 2315a—third end surface; 2316—third concave portion; 2316a—third bottom wall; 2317—fourth concave portion; 232—electrode terminal; 2321—terminal main body; 2322—connection body; 233—insulating member; 2331—first concave portion; 2331a—second bottom wall; 2332—first convex portion; 2332a—second end surface; 2333—second body; 2333a—second inner surface; 2333b—second outer surface; 234—pressure relief mechanism; 24—current collecting member; 241—second connection portion; 242—third connection portion; 243—fourth connection portion; 244—protrusion; 25—sealed space; 30—battery module; 31—busbar component; 100—battery; 200—controller; 300—motor; 1000—vehicle; 1100—first providing apparatus; 1200—second providing apparatus; 1300—third providing apparatus; 1400—fourth providing apparatus; 1500—assembling apparatus; 2000—manufacturing device; Z—thickness direction; and X—preset direction.

DESCRIPTION OF EMBODIMENTS

To make the objectives, technical solutions and advantages of the embodiments of the present application clearer, the following clearly describes the technical solutions in the embodiments of the present application with reference to the accompanying drawings in the embodiments of the present application. Apparently, the described embodiments are merely some but not all of the embodiments of the present application. All the other embodiments obtained by those of ordinary skill in the art based on the embodiments of the present application without any inventive effort shall fall within the scope of protection of the present application.

Unless otherwise defined, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms "including" and "having" and any variations thereof in the specification and the claims of the present application as well as the foregoing description of the accompanying drawings are intended to cover non-exclusive inclusions. The terms "first", "second" and the like in the specification and the claims of the present application as well as the above drawings are used to distinguish different objects, rather than to describe a specific order or primary-secondary relationship.

The phrase "embodiments" referred to in the present application means that the descriptions of specific features, structures, and characteristics in combination with the embodiments are included in at least an embodiment of the present application. The phrase at various locations in the specification does not necessarily refer to the same embodiment, or an independent or alternative embodiment exclusive of another embodiment.

In the description of the present application, it should be noted that unless otherwise explicitly specified and defined, the terms "mounting", "connecting", "connection" and "attaching" should be understood in a broad sense, for example, they may be a fixed connection, a detachable connection, or an integrated connection; may be a direct connection and may also be an indirect connection via an intermediate medium, or may be communication between the interiors of two elements. Those of ordinary skill in the art may appreciate the specific meanings of the foregoing terms in the present application according to specific circumstances.

In the present application, the term "and/or" is only an association relation describing associated objects, which means that there may be three relations. For example, A and/or B may represent three situations: A exists alone, both A and B exist, and B exists alone. In addition, the character "/" in the present application generally indicates that the associated objects before and after the character are in an "or" relation.

In the embodiments of the present application, same components are denoted by same reference numerals, and detailed description of the same components is omitted in different embodiments for brevity. It should be understood that dimensions such as thicknesses, lengths and widths of various components in embodiments of the present application shown in the drawings, as well as dimensions of the overall thickness, length and width of an integrated apparatus are merely illustrative, and should not constitute any limitation to the present application.

In the present application, "a plurality of" means two or more (including two).

In the present application, battery cells may include lithium-ion secondary batteries, lithium-ion primary batteries, lithium-sulfur batteries, sodium/lithium-ion batteries, sodium-ion batteries or magnesium-ion batteries, and the like, which are not limited by the embodiments of the present application. The battery cells may be cylindrical, flat, cuboid or in another shape, which is not limited by the embodiments of the present application. The battery cell is generally divided into three types according to the way of packaging: a cylindrical battery cell, a prismatic battery cell and a pouch battery cell, which are not limited by the embodiments of the present application.

The battery mentioned in the embodiments of the present application refers to a single physical module that includes one or more battery cells to provide a higher voltage and capacity. For example, the battery mentioned in the present application may include a battery module or a battery pack. The battery generally includes a box body for enclosing one or more battery cells. The box body may prevent liquid or other foreign matters from affecting the charging or discharging of the battery cells.

The battery cell includes an electrode assembly and an electrolytic solution, and the electrode assembly is composed of a positive electrode plate, a negative electrode plate and a separator. The operation of the battery cell mainly relies on the movement of metal ions between the positive electrode plate and the negative electrode plate. The positive electrode plate includes a positive electrode current collector and a positive active material layer. The positive active material layer is coated on a surface of the positive electrode current collector, and the positive electrode current collector that is not coated with the positive active material layer protrudes from the positive electrode current collector coated with the positive active material layer and is used as a positive electrode tab. As an example, in a lithium-ion battery, the material of the positive electrode current collector may be aluminum, and the positive electrode active material may be lithium cobalt oxides, lithium iron phosphate, ternary lithium or lithium manganate, and the like. The negative electrode plate includes a negative electrode current collector and a negative active material layer. The negative active material layer is coated on a surface of the negative electrode current collector, and the negative electrode current collector that is not coated with the negative active material layer protrudes from the negative electrode current collector coated with the negative active material layer and is used as a negative electrode tab. The material of the negative electrode current collector may be copper, and the negative active material may be carbon or silicon, and the like. In order to ensure that no fusing occurs when a large current passes through, there are a plurality of positive electrode tabs which are laminated together, and there are a plurality of negative electrode tabs which are laminated together. A material of the separator may be PP (polypropylene) or PE (polyethylene), or the like. In addition, the electrode assembly may be a coiled structure or a laminated structure, and the embodiments of the present application are not limited thereto.

The battery cell may also include a housing and an end cover assembly, the end cover assembly covers at the housing, to provide a sealed space for the electrode assembly and the electrolytic solution, and the tab of the electrode assembly and the end cover assembly of the electrode terminal are electrically connected through the current collecting member. For a general battery cell, the capacity of the battery cell may be affected by the end cover assembly.

The inventor found that in a battery cell, after the end cover of the end cover assembly covers the housing, the tab and the current collecting member are located in the housing, and the tab and the current collecting member occupy a part of the space inside the housing, so that the space inside the housing that can be provided to the electrode assembly is reduced, thereby causing the capacity of the battery cell to be reduced.

In view of this, the embodiments of the present application provide a technical solution, by forming a first concave portion on one side of the insulating member facing the electrode assembly, and forming a first convex portion on one side of the insulating member facing away from the electrode assembly at a position corresponding to the first concave portion, and forming a second concave portion on the side of the end cover facing the electrode assembly, the first convex portion is accommodated in the second concave portion, and at least a part of the tab and/or at least a part of the current collecting member are accommodated in the first concave portion to make more space for the electrode assembly, thereby increasing the capacity of the battery cell.

The technical solution described in embodiments of the present application is applicable to a battery and a power consumption device using the battery.

The power consumption device may be vehicles, mobile phones, portable devices, notebook computers, ships, spacecraft, electric toys, electric tools, and the like. The vehicle can be fuel vehicles, gas vehicles or new energy vehicles; new energy vehicles can be pure electric vehicles, hybrid vehicles or extended range vehicles, and the like; the spacecrafts include airplanes, rockets, space shuttles and spaceships, or the like; the electric toys include fixed or mobile electric toys, such as game consoles, electric vehicle toys, electric ship toys and electric airplane toys, or the like; the electric tools include metal cutting power tools, grinding power tools, assembly power tools and railway power tools, such as electric drills, electric grinders, electric wrenches, electric screwdrivers, electric hammers, impact drills, concrete vibrators, and electric planers, and the like. The embodiment of the present application does not impose special restrictions on the above power consumption devices.

For the convenience of description, the following embodiments take a vehicle as an example of the power consumption device for description.

Please refer to FIG. 1. FIG. 1 is a schematic structural diagram of a vehicle 1000 provided by some embodiments of the present application. A battery 100 is provided inside the vehicle 1000, and the battery 100 may be provided at the bottom, head, or tail of the vehicle 1000. The battery 100 may be used for power supply of the vehicle 1000, for example, the battery 100 may be used as an operating power source of the vehicle 1000.

The vehicle 1000 further includes a controller 200 and a motor 300. The controller 200 is configured to control the battery 100 to supply power to the motor 300, for example, for starting, navigating, and working power requirements during driving of the vehicle 1000.

In some embodiments of the present application, the battery 100 may serve not only as an operation power source of the vehicle 1000, but also as a driving power source of the vehicle 1000, replacing or partially replacing fuel or natural gas to provide driving power for the vehicle 1000.

Figure 2:
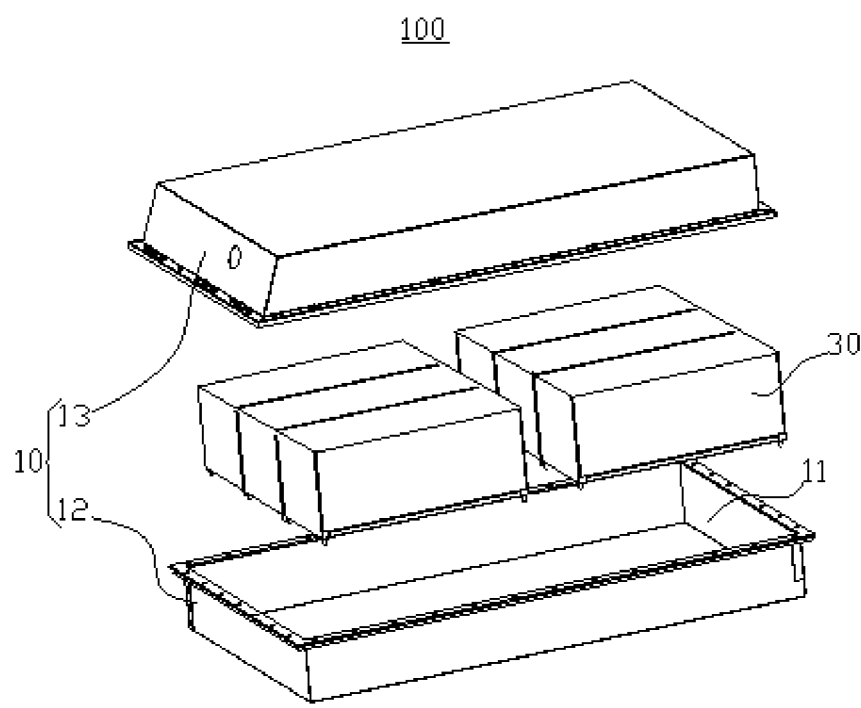
FIG. 2 is an exploded view of a battery provided by some embodiments of the present application.

Please refer to FIG. 2. FIG. 2 is an exploded view of the battery 100 provided by some embodiments of the present application. The battery 100 includes a box body 10 and a battery cell 20, and the battery cell 20 is accommodated in the box body 10.

Where, the box body 10 is used for providing an accommodating space 11 for the battery cell 20, and the box body 10 may have various structures.

In some embodiments, the box body 10 may include a first portion 12 and a second portion 13, the first portion 12 and the second portion 13 covers each other, and the first portion 12 and the second portion 13 together define the accommodating space 11 for accommodating the battery cell 20. The second portion 13 may be a hollow structure with an open end, and the first portion 12 may be a plate-shaped structure, and the first portion 12 covers an opening side of the second portion 13, so that the first portion 12 and the second portion 13 jointly define the accommodating space 11. The first portion 12 and the second portion 13 may also be hollow structures with one side open, and the opening side of the first portion 12 covers the opening side of the second portion 13. Of course, the box body 10 formed by the first portion 12 and the second portion 13 may have various shapes, such as a cylinder, a cuboid, and the like.

In the battery 100, there may be one or more battery cells 20. If there are a plurality of battery cells 20, the plurality of battery cells 20 can be connected in series or in parallel or in parallel-series. The parallel-series connection refers to that the plurality of battery cells 20 are connected both in series and in parallel. The plurality of battery cells 20 can be directly connected in series or in parallel or in parallel-series, and then an entirety formed by a plurality of battery cells 20 is accommodated in the box body 10. Of course, a plurality of battery cells 20 may also be connected in series first, or in parallel or in parallel-series to form a battery module 30; then a plurality of battery modules 30 are connected in series or in parallel or in parallel-series to form as an entirety and accommodated in the box body 10.

Figure 3:
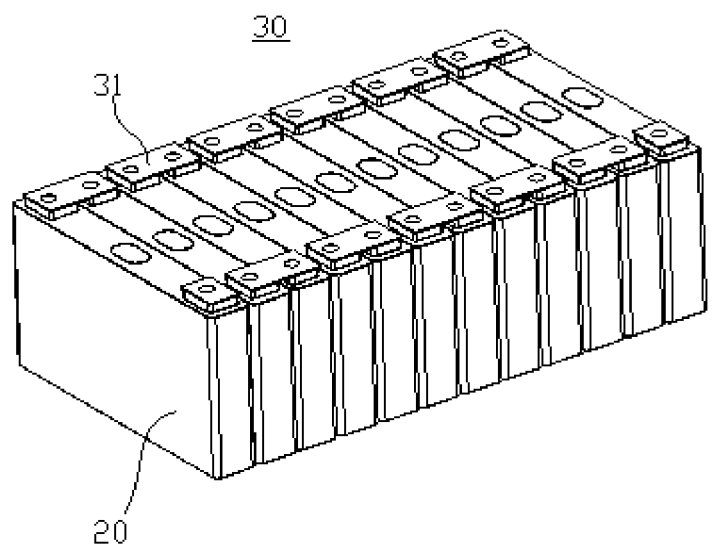
FIG. 3 is a schematic structural diagram of a battery module shown in FIG. 2.

In some embodiments, please refer to FIG. 3, FIG. 3 is a schematic structural diagram of the battery module 30 shown in FIG. 2. The battery 100 includes a plurality of battery modules 30. The battery module 30 includes a plurality of battery cells 20, and the plurality of battery cells 20 are first connected in series, or in parallel or in parallel-series to form the battery module 30. The plurality of battery modules 30 are then connected in series or in parallel or in parallel-series to form as the entirety, and accommodated in the box body 10 (refer to FIG. 2).

The plurality of battery cells 20 in the battery module 30 may be electrically connected through a busbar component 31, so as to realize the connection of the plurality of battery cells 20 in the battery module 30 in series, or in parallel or in parallel-series.

Figure 4:
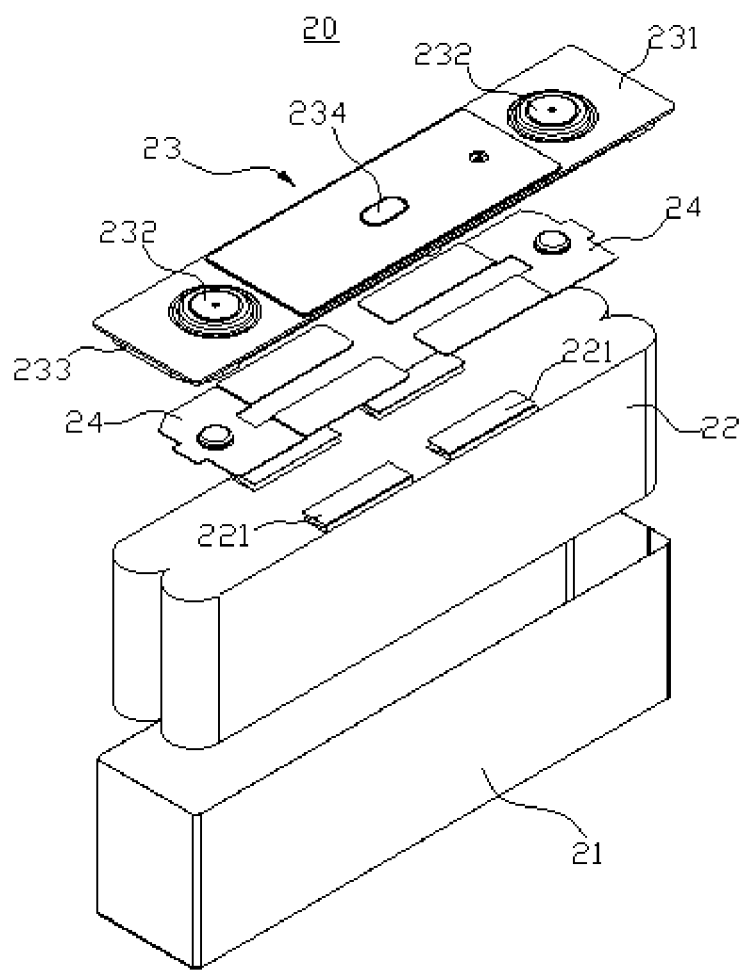
FIG. 4 is an exploded view of a battery cell provided by some embodiments of the present application.

Please refer to FIG. 4, FIG. 4 is an exploded view of the battery cell 20 provided by some embodiments of the present application. The battery cell 20 includes a housing 21, an electrode assembly 22, an end cover assembly 23 and a current collecting member 24. The housing 21 has an opening, the electrode assembly 22 is accommodated in the housing 21, and the electrode assembly 22 includes a tab 221. The end cover assembly 23 includes an end cover 231, an electrode terminal 232 and an insulating member 233, where the end cover 231 is used to cover at an opening, the electrode terminal 232 is mounted to the end cover 231, and the insulating member 233 is located on one side of the end cover 231 facing the electrode assembly 22. The current collecting member 24 is used to connect the electrode terminal 232 and the tab 221, so that the tab 221 is electrically connected to the electrode terminal 232.

Where, the housing 21 may have various shapes, such as a cylinder, a cuboid, or the like. The shape of the housing 21 may be determined according to a specific shape of the electrode assembly 22. For example, if the electrode assembly 22 has a cylindrical structure, then the housing 21 may be selected as a cylindrical structure; if the electrode assembly 22 has a cuboid structure, then the housing 21 may be selected as a cuboid structure. In FIG. 4, exemplarily, the housing 21 and the electrode assembly 22 both have a cuboid structure.

The housing 21 may be made of various materials, such as copper, iron, aluminum, stainless steel, aluminum alloy, plastic, and the like, which are not particularly limited in the embodiment of the present application.

There may be one or more electrode assemblies 22 accommodated in the housing 21. In FIG. 4, there are two electrode assemblies 22 accommodated in the housing 21.

Figure 5:
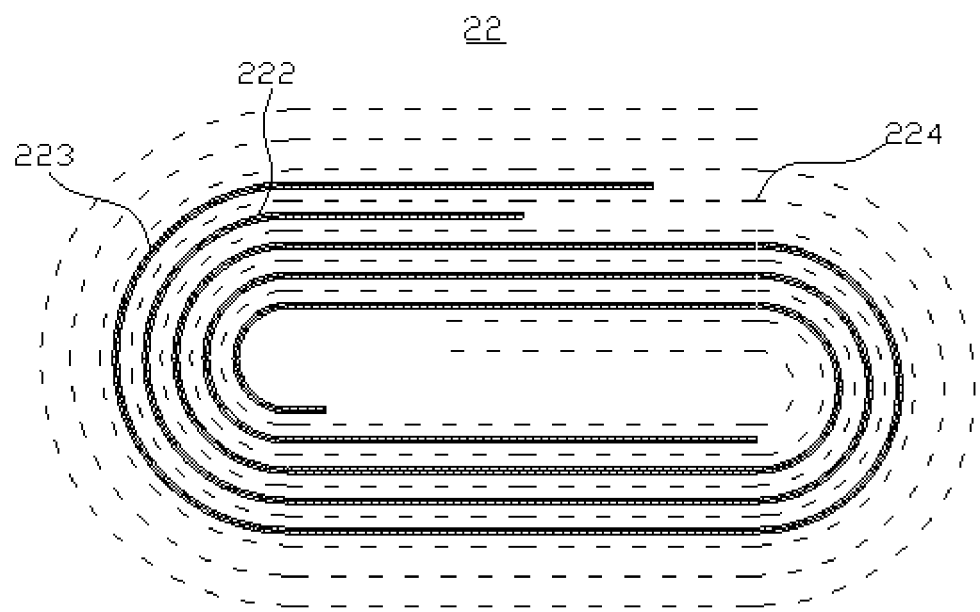
FIG. 5 is a schematic structural diagram of an electrode assembly provided by some embodiments of the present application.

In some embodiments, please refer to FIG. 5, FIG. 5 is a schematic structural diagram of the electrode assembly 22 provided by some embodiments of the present application. The electrode assembly 22 may further include a positive electrode plate 222, a negative electrode plate 223 and a separator 224. The electrode assembly 22 may be a winding structure formed by winding the positive electrode plate 222, the separator 224 and the negative electrode plate 223, and the electrode assembly 22 may also be a laminated structure formed by disposing the positive electrode plate 222, the separator 224 and the negative electrode plate 223 in a laminating manner. FIG. 5 exemplarily shows a situation that the electrode assembly 22 is a winding structure.

The positive electrode plate 222 may include a positive electrode current collector and a positive active material layer, and the positive active material layer is coated on a surface of the positive electrode current collector. The negative electrode plate 223 may include a negative electrode current collector and a negative active material layer, and the negative active material layer is coated on a surface of the negative electrode current collector. The separator 224 is located between the positive electrode plate 222 and the negative electrode plate 223, and is used for isolating the positive electrode plate 222 from the negative electrode plate 223, so as to reduce the risk of short circuit between the positive electrode plate 222 and the negative electrode plate 223.

Where, a material of the separator 224 may be PP (polypropylene) or PE (polyethylene), and the like.

The tabs 221 in the electrode assembly 22 are divided into a positive electrode tab and a negative electrode tab. The positive electrode tab may be a part of the positive electrode current collector that is not coated with the positive active material layer; and the negative electrode tab may be a part of the negative electrode current collector that is not coated with the negative active material layer.

Figure 6:
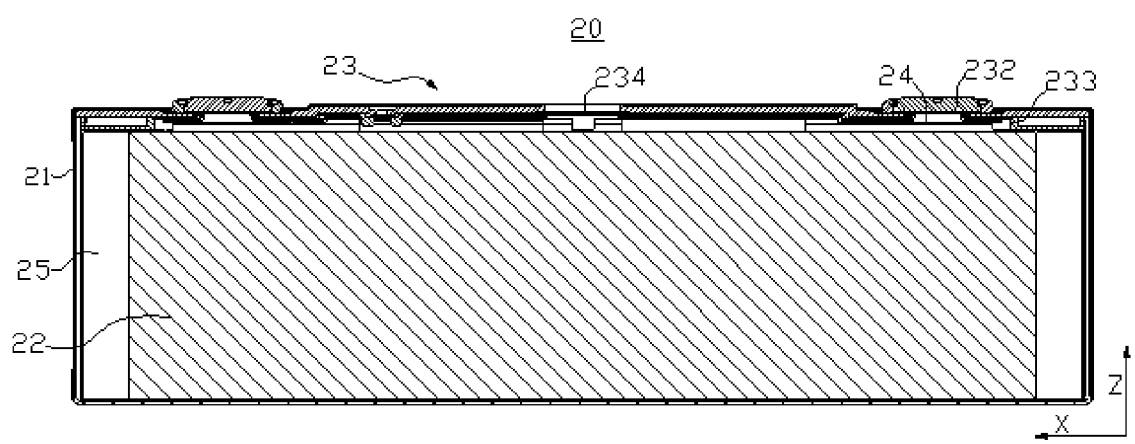
FIG. 6 is a cross-sectional view of the battery cell shown in FIG. 4.

In the embodiment of the present application, please refer to FIG. 6, FIG. 6 is a cross-sectional view of the battery cell 20 shown in FIG. 4. The end cover 231 of the end cover assembly 23 is used to cover at an opening of the housing 21, to form a sealed space 25 for accommodating the battery cell 20, and the sealed space 25 is further used to accommodate an electrolyte, such as an electrolytic solution. The electrode terminal 232 of the end cover assembly 23 is an output component for outputting electric energy of the battery cell 20. There may be one or two electrode terminals 232 in the end cover assembly 23.

There may be one or two openings of the housing 21. If there is one opening for the housing 21, then there may be one end cover assembly 23; and if there are two openings for the housing 21, then there may be two end cover assemblies 23, and the end covers 231 in the two end cover assemblies 23 cover at the two openings, respectively.

In some embodiments, as shown in FIG. 6, there is one opening for the housing 21, and there is also one end cover assembly 23. The end cover assembly 23 may be provided with two electrode terminals 232. One electrode terminal 232 in the end cover assembly 23 is electrically connected to one tab 221 (positive electrode tab) of the electrode assembly 22 through one current collecting member 24; and another electrode terminal 232 in the end cover assembly 23 is electrically connected to another tab 221 (negative electrode tab) of the electrode assembly 22 through another current collecting member 24.

In yet other embodiments, there are two openings of the housing 21, the two openings are provided on opposite sides of the housing 21. There are two end cover assemblies 23, and the two end cover assemblies 23 cover at the two openings of the housing 21, respectively. In this case, there may be one electrode terminal 232 in the end cover assembly 23, the electrode terminal 232 in one end cover assembly 23 may be electrically connected to one tab 221 (positive electrode tab) of the electrode assembly 22 through one current collecting member 24; and the electrode terminal 232 of another end cover assembly 23 may be electrically connected to another tab 221 (negative electrode tab) of the electrode assembly 22 through another current collecting member 24.

In some implementations, the battery cell 20 may further include a pressure relief mechanism 234, where the pressure relief mechanism 234 is mounted to the end cover 231, and the pressure relief mechanism 234 is configured to discharge the pressure inside the battery cell 20 when the internal pressure or temperature of the battery cell 20 reaches a predetermined value.

Of course, if there is one end cover assembly 23 in the battery cell 20, then the pressure relief mechanism 234 may be mounted to the end cover 231 of the end cover assembly 23; if there are two end cover assemblies 23 in the battery cell 20, the pressure relief mechanism 234 may be mounted to the end cover 231 of each of the end cover assemblies 23, or the pressure relief mechanism 234 may be only mounted to one end cover 231 of the end cover assembly 23.

Exemplarily, the pressure relief mechanism 234 may be an explosion-proof valve, a rupture plate, a gas valve, a pressure relief valve, or a safety valve, and the like.

Figure 7:
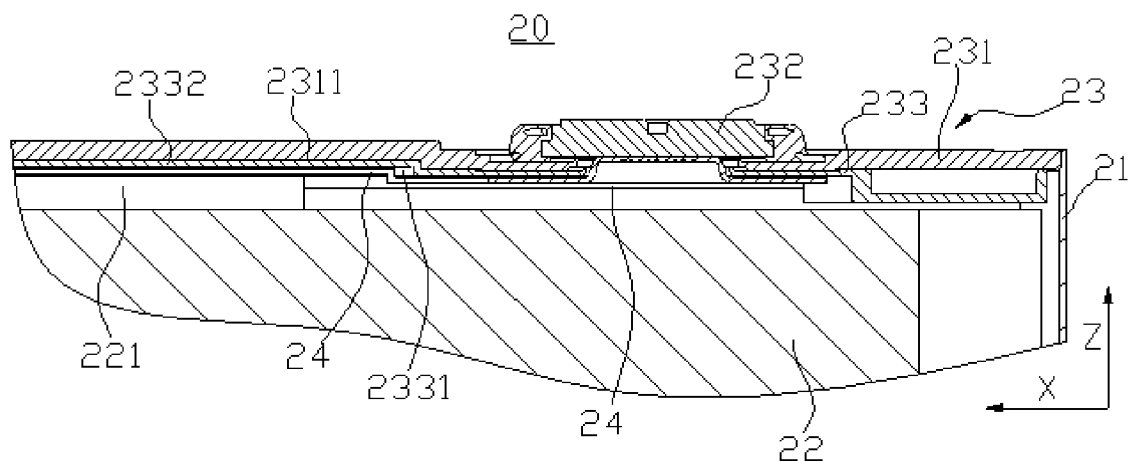
FIG. 7 is a partially enlarged view of the battery cell shown in FIG. 6.

In the embodiment of the present application, in order to improve the capacity of the battery cell 20, please refer to FIG. 7, FIG. 7 is a partially enlarged view of the battery cell 20 shown in FIG. 6. A first concave portion 2331 is formed on one side of the insulating member 233 facing the electrode assembly 22, the first concave portion 2331 is configured to accommodate at least a part of the tab 211 and/or at least a part of the current collecting member 24, a first convex portion 2332 is formed on one side of the insulating member 233 facing away from the electrode assembly 22 at a position corresponding to the first concave portion 2331, a second concave portion 2311 is formed at the side of the end cover 231 facing the electrode assembly 22, and the second concave portion 2311 is used to accommodate the first convex portion 2332.

In the above structure, the first concave portion 2331 can accommodate the at least a part of the tab 221 and/or the at least a part of the current collecting member 24, which can make more space for the electrode assembly 22. The first convex portion 2332 is formed on the side of the insulating member 233 facing away from the electrode assembly 22 and corresponding to the first concave portion 2331. On the one hand, the first convex portion 2332 can act as a reinforcement at the position where the first concave portion 2331 is provided on the insulating member 233, on the other hand, the arrangement of the first convex portion 2332 can make the first concave portion 2331 be recessed as much as possible along the direction facing away from the electrode assembly 22, so as to increase the recess depth of the first concave portion 2331. In addition, a second concave portion 2311 is formed on the side of the end cover 231 facing the electrode assembly 22, and the first convex portion 2332 is accommodated in the second concave portion 2311, which reduces the space inside the housing 21 occupied by the insulating member 233 and further makes more space for the electrode assembly 22, thereby effectively increasing the capacity of battery cell 20.

It should be noted that the first concave portion 2331 is configured to accommodate at least a part of the tab 221 and/or at least a part of the current collecting member 24, that is, the at least a part of the tab 221 may be accommodated in the first concave portion 2331, or the at least a part of the current collecting member 24 may be accommodated in the first concave portion 2331, or the at least a part of the tab 221 and the at least a part of the current collecting member 24 are both accommodated in the second concave portion 2311.

Exemplarily, shapes of the first concave portion 2331, the first convex portion 2332 and the second concave portion 2311 may be a cylinder, a cuboid, and the like.

In some embodiments, the first concave portion 2332 and the second concave portion 2311 may form a positioning engagement, which can restrict the insulating member 233 from moving relative to the end cover 231 in the direction perpendicular to a thickness direction Z of the end cover 231.

When assembling the insulating member 233 and the end cover 231, inserting the first convex portion 2332 into the second concave portion 2311 can realize the positioning of the insulating member 233 and the end cover 231, so as to realize the accurate and rapid assembly of the insulating member 233 and the end cover 231.

Of course, the first convex portion 2332 and the first concave portion 2331 form a positioning engagement, and an outer surface of the first convex portion 2332 and an inner surface of the second concave portion 2311 may form a positioning engagement. Taking the first convex portion 2332 and the second concave portion 2311 being in a cylindrical shape as an example, an outer diameter of the first convex portion 2332 matches an inner diameter of the second concave portion 2311, and an outer circumference of the first convex portion 2332 matches an inner circumference of the second concave portion 2311.

In the embodiment of the present application, a gap may be presented between the electrode assembly 22 and the insulating member 233 in the thickness direction Z of the end cover 231; the electrode assembly 22 may also abut against the insulating member 233 along the direction facing away from the electrode assembly 22, so that the electrode assembly 22 and the insulating member 233 are more compact, which is beneficial to increase the capacity of the battery cell 20. FIG. 7 exemplarily shows a situation that the electrode assembly 22 abuts against the insulating member 233 along the direction facing away from the electrode assembly 22.

Figure 8:
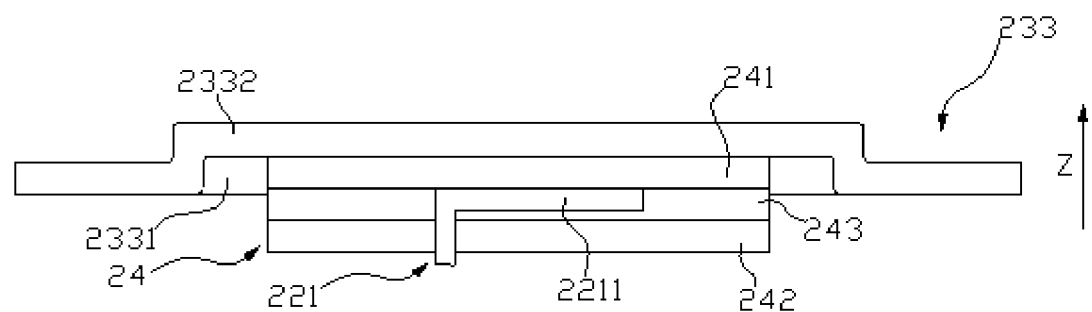
FIG. 8 is a positional relationship diagram of an insulating member, a current collecting member and a tab shown in FIG. 7.

In some other embodiments, please refer to FIG. 8, FIG. 8 is a positional relationship diagram of the insulating member 233, the current collecting member 24 and a tab 221 shown in FIG. 7. The tab 221 includes a first connection portion 2211, the current collecting member 24 includes a second connection portion 241, and the second connection portion 241 is used to connect the first connection portion 2211 of the tab 221. The first concave portion 2331 is configured to accommodate at least a part of the first connection portion 2211 and/or at least a part of the second connection portion 241.

The first connection portion 2211 is the part where the tab 221 is connected to the current collecting member 24, and the second connection portion 241 is the part where the current collecting member 24 is connected to the tab 221. Exemplarily, the first connection portion 2211 and the second connection portion 241 are welded together.

Optionally, the first connection portion 2211 and the second connection portion 241 are laminated and distributed in the thickness direction Z of the end cover 22, which is convenient for connecting the first connection portion 2211 and the second connection portion 241 together.

The first connection portion 2211 and the second connection portion 241 are laminated and distributed in the thickness direction Z of the end cover 231. The first connection portion 2211 and the second connection portion 241 as a whole will occupy a relatively large space inside the housing 21, but accommodating at least a part of the first connection portion 2211 of the tab 221 and/or at least a part of the second connection portion 241 of the current collecting member 24 in the first concave portion 2331 can then make more space for the electrode assembly 22.

Figure 9:
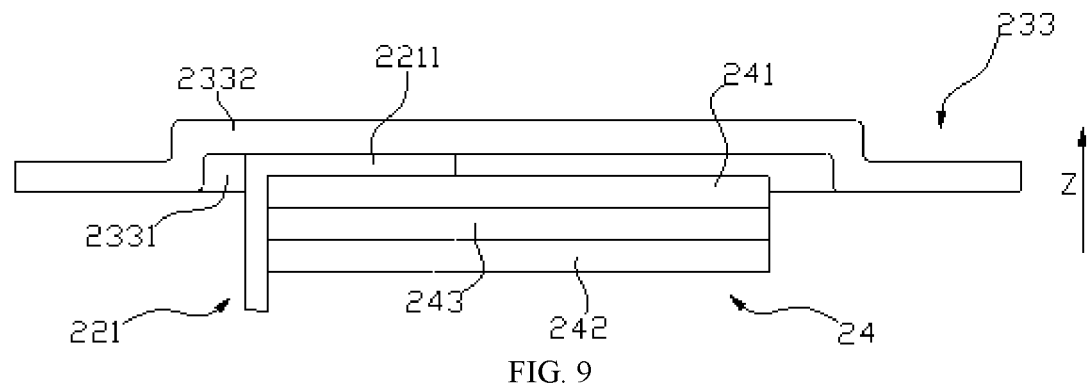
FIG. 9 is a positional relationship diagram of an insulating member, a current collecting member and a tab provided by still other embodiments of the present application.
Figure 10:
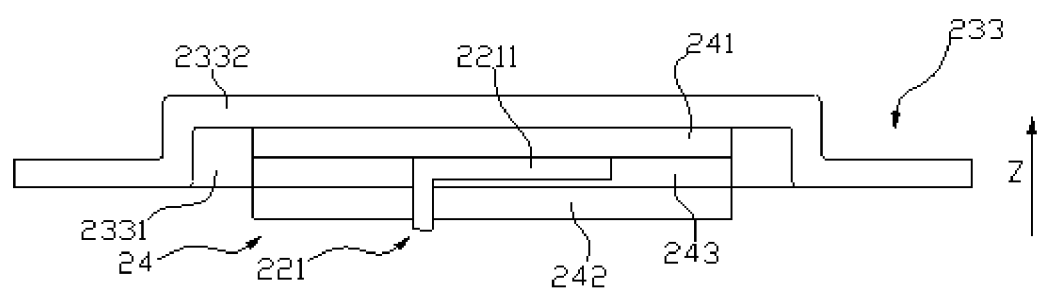
FIG. 10 is a positional relationship diagram of an insulating member, a current collecting member and a tab provided by yet other embodiments of the present application.

In some embodiments, as shown in FIG. 8, in the thickness direction Z of the end cover 231, the first connection portion 2211 is closer to the electrode assembly 22 than the second connection portion 241 (refer to FIG. 7), and the second connection portion 241 is accommodated in the first concave portion 2331. In still other embodiments, please refer to FIG. 9, FIG. 9 is a positional relationship diagram of the insulating member 233, the current collecting member 24 and the tab 221 provided by still other embodiments of the present application, in the thickness direction Z of the end cover 231, the second connection portion 241 is closer to the electrode assembly 22 than the first connection portion 2211, and the first connection portion 2211 is accommodated in the first concave portion 2331. In yet other embodiments, please refer to FIG. 10, FIG. 10 is a positional relationship diagram of the insulating member 233, the current collecting member 24 and the tab 221 provided by yet other embodiments of the present application. The first connection portion 2211 and the second connection portion 241 are both accommodated in the third concave portion 2331, so as to further make more space for the electrode assembly 22.

Figure 11:
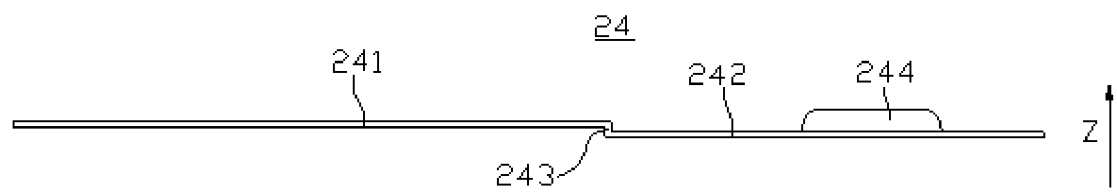
FIG. 11 is a schematic structural diagram of the current collecting member shown in FIG. 7.

In some embodiments, please refer to FIG. 11, FIG. 11 is a schematic structural diagram of the current collecting member 24 shown in FIG. 7, the current collecting member 24 may further include a third connection portion 242 and a fourth connection portion 243, where the third connection portion 242 is used to connect to the electrode terminal 232, the third connection portion 242 is connected to the second connection portion 241 through the fourth connection portion 243, the third connection portion 242 and the second connection 241 are spaced apart in the thickness direction Z of the end cover 231. For the current collecting member 24 of this structure, the second connection portion 241 may be accommodated in the third concave portion 2331, and the third connection portion 242 may be located on one side of the insulating member 233 close to the electrode assembly 22.

Exemplarily, the second connection portion 241, the fourth connection portion 243 and the third connection portion 242 are sequentially connected to form a "Z"-shaped plate structure. Where, in the thickness direction Z of the end cover 231, one side of the third connection portion 242 closer to the second connection portion 241 is provided with a protrusion 244 used to connect and fix the electrode terminal 232, for example, the protrusion 244 is welded to the electrode terminal 232.

Figure 12:
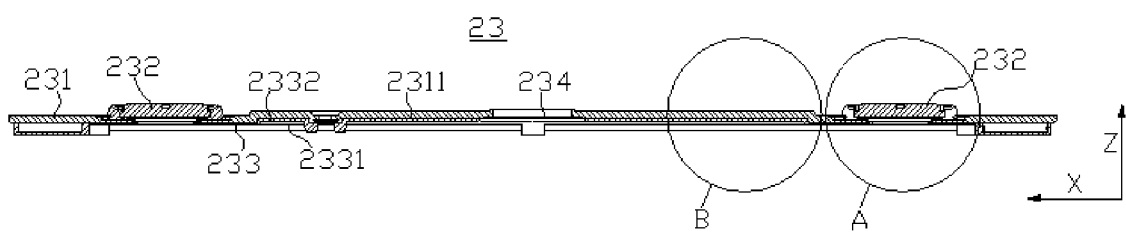
FIG. 12 is a schematic structural diagram of an end cover assembly shown in FIG. 7.

In the embodiment of the present application, the second concave portion 2311 may be provided at a plurality of positions of the end cover 231. In some embodiments, please refer to FIG. 12, FIG. 12 is a schematic structural diagram of the end cover assembly 23 shown in FIG. 7, the electrode terminal 232 is staggered from the second concave portion 2311 in a preset direction X (refer to FIG. 7), and the preset direction is perpendicular to the thickness direction Z of the end cover 231.

The electrode terminal 232 is staggered from the second concave portion 2311 in the direction perpendicular to the thickness direction Z of the end cover 231, that is, the electrode terminal 232 is at a distance from the second concave portion 2311 in the preset direction X, so that the second concave portion 2311 is formed outside the area where the end cover 231 is mounted with the electrode terminal 232, and the arrangement of the second concave portion 2311 will not affect the mounting of the electrode terminal 232.

Exemplarily, the preset direction X is a length direction of the end cover 231.

It should be noted that, in the end cover assembly 23, either one electrode terminal 232 or two electrode terminals can be staggered from the second concave portion 2311 in the preset direction X. It is understandable that if there are two electrode terminals 232 in the end cover assembly 23, the two electrode terminals 232 are both staggered from the second concave portion 2311 in the preset direction X.

In some embodiments, please continue to refer to FIG. 12, there are two electrode terminals 232 in the end cover assembly 23, and the second concave portion 2311 is located between the two electrode terminals 232 along the preset direction X, that is, the second concave portion 2311 is provided in the area between the two electrode terminals 232 of the end cover 231, so that the two electrode terminals 232 are staggered from the second concave portion 2311 in the preset direction X, and reasonably utilizes the space between the two electrode terminals 232.

Of course, there are two electrode terminals 232 in the end cover assembly 23, and there may also be two current collecting members 24. Taking the at least a part of the current collecting member 24 accommodated in the first concave portion 2331 as an example, the at least a part of the two current collecting members 24 may both be partially accommodated in the same first concave portion 2331. Of course, two first concave portion 2331 may also be formed on the insulating member 233. The at least a part of one collecting member 24 is accommodated in one first concave portion 2331 and the at least a portion of another collecting member 24 is accommodated in another first concave portion 2331. In the end cover assembly 23 shown in FIG. 12, a second concave portion 2311 is formed on the end cover 231, a first concave portion 2331 and a second convex portion 2314 are formed on the insulating member 233, and the two current collecting members 24 are at least partially accommodated in the first concave portion 2331, for example, the second connection portion 241 of the two current collecting members 24 are both accommodated in the first concave portion 2331.

In other embodiments, the second concave portion 2311 may not be staggered from the electrode terminal 232 in the preset direction X. For example, the second concave portion 2311 is formed at the position where the electrode terminal 232 is provided on the end cover 231, and the second concave portion 2311 and the electrode terminal 232 are respectively located on both sides of the end cover 231 in the thickness direction Z.

Figure 13:
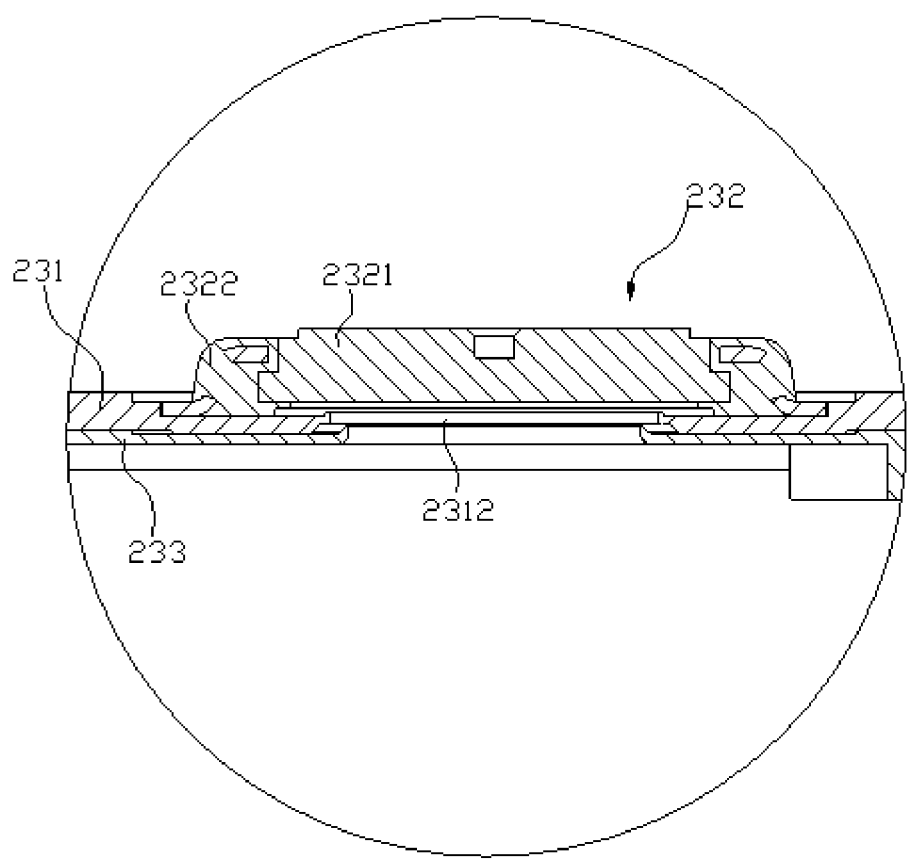
FIG. 13 is a partially enlarged view of a point A of the end cover assembly shown in FIG. 12.

In some embodiments, please refer to FIG. 13, FIG. 13 is a partially enlarged view of a point A of the end cover assembly 23 shown in FIG. 12, the electrode terminal 232 includes a terminal main body 2321 and a connection body 2322, where the terminal main body 2321 is mounted to the end cover 231 through the connection body 2322, and the terminal main body 2321 is used to connect to the current collecting member 24 to realize the electrical connection between the terminal main body 2321 and the tab 221.

The connection body 2322 may be circumferentially coated around the outer circumference of the terminal main body 2321, so as to realize fixation of the connection body 2322 and the terminal main body 2321. The connection body 2322 and the end cover 231 may be fixed and connected.

Exemplarily, the connection member has a ring structure, and the connection member is welded to the end cover 231.

In addition, the end cover 231 is provided with an electrode extraction hole 2312, and the protrusion 244 (refer to FIG. 11) on the third connection portion 242 of the current collecting member 24 can pass through the electrode extraction hole 2312 and be connected and fixed to the electrode terminal 232, for example, the protrusion 244 is welded to the electrode terminal 232.

In the embodiment of the present application, the second concave portion 2311 on the end cover 231 has various forms, which will be described in detail below with reference to the accompanying drawings.

Figure 14:
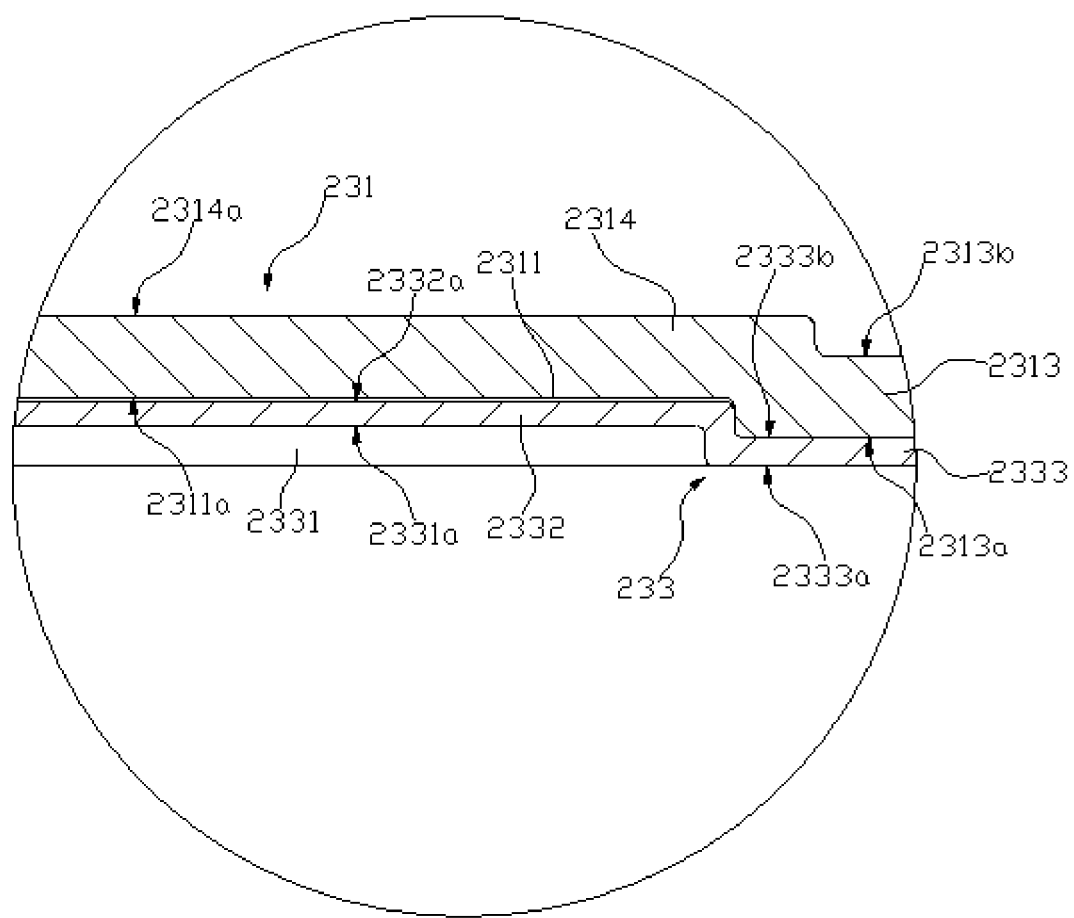
FIG. 14 is a partially enlarged view of a point B of the end cover assembly shown in FIG. 12.

In some embodiments, please refer to FIG. 14, FIG. 14 is a partially enlarged view of a point B of the end cover assembly 23 shown in FIG. 12, the end cover 231 includes a first body 2313, where the first body 2313 is used to cover the opening. The first body 2313 has a first inner surface 2313a facing the electrode assembly 22 (refer to FIG. 7), and the second concave portion 2311 is recessed from the first inner surface 2313a along the direction facing away from the electrode assembly 22. The end cover 231 of this structure has a simple structure and is easy to be formed and manufactured.

In some embodiments, the end cover 231 further includes a second convex portion 2314; the first body 2313 further has a first outer surface 2313b provided opposite to the first inner surface 2313a, and the second convex portion 2314 is protrudingly provided on the first outer surface 2313b and is located at a position corresponding to the second concave portion 2311. The second convex portion 2314 can act as a reinforcement at the position of the first body 2313 where the second concave portion 2311 is provided, and improve the firmness of the end cover 231.

Optionally, the second convex portion 2314 has a first end surface 2314a, the second convex portion 2314 extends to the first end surface 2314a from the first outer surface 2313b along the direction facing away from the electrode assembly 22, and the first end surface 2314a does not exceed the electrode terminal 232 in the direction facing away from the electrode assembly 22 (refer to FIG. 12). The second convex portion 2314 reasonably utilizes the space between the first outer surface 2313b of the first body 2313 and an end portion of the electrode terminal 232, which reduces the risk of increasing the space occupied by the entire battery cell 20 due to the first end surface 2314a exceeding the electrode terminal 232.

If the end cover assembly 23 is provided with the pressure relief mechanism 234 (refer to FIG. 6), the pressure relief mechanism 234 can be mounted to the end cover 231 in an area corresponding to the second convex portion 2314. Taking the pressure relief mechanism 234 being a rupture plate as an example, the second convex portion 2314 may be provided with a pressure relief hole (not shown) that communicates with the second concave portion 2311 and penetrates the first end surface 2314a of the second convex portion 2314, and the rupture plate is mounted to the end cover 231 and blocks the pressure relief hole.

Figure 15:
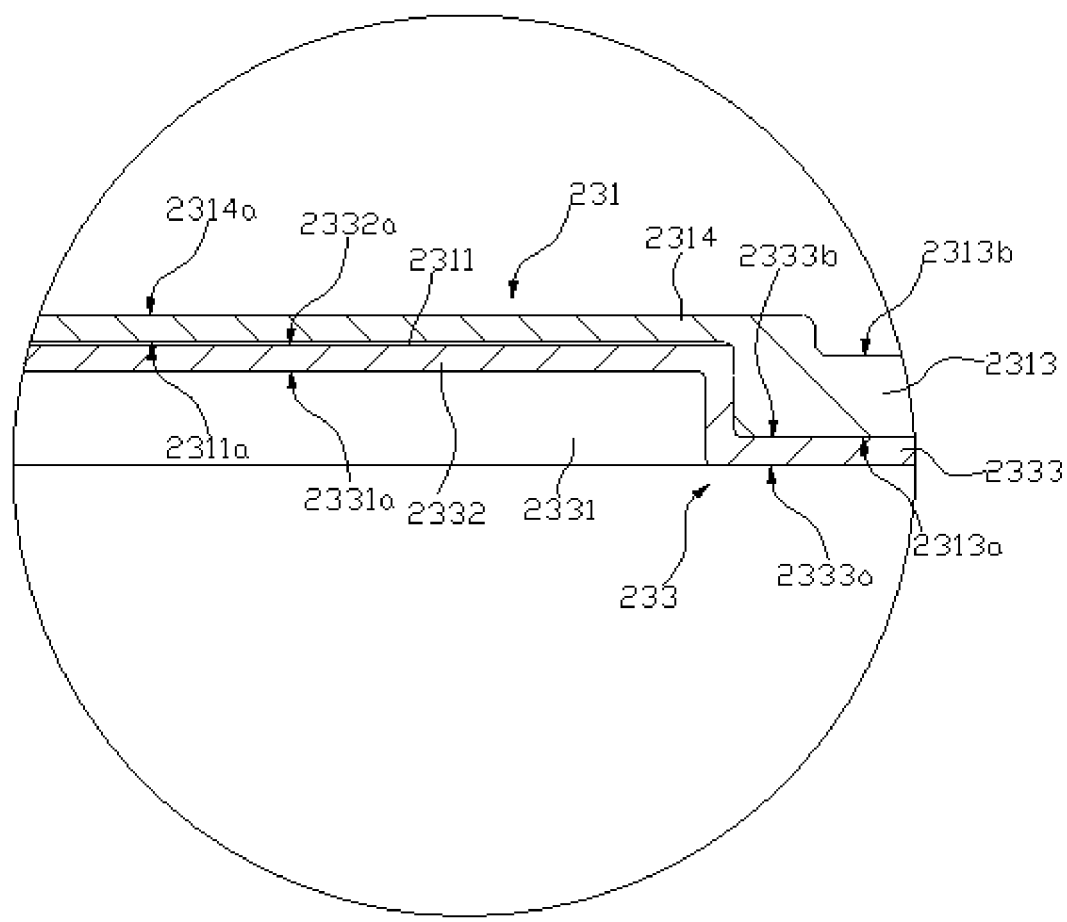
FIG. 15 is a schematic connection diagram of an insulating member and an end cover provided by yet other embodiments of the present application.

The second concave portion 2311 has a first bottom wall 2311a, the second concave portion 2311 is recessed to the first bottom wall 2311a from the first inner surface 2313a along the direction facing away from the electrode assembly 22. In some other embodiments, as shown in FIG. 14, the first bottom wall 2311a exceeds the first outer surface 2313b along the direction facing the electrode assembly 22. In yet other embodiments, please refer to FIG. 15, FIG. 15 is a schematic connection diagram of the insulating member 233 and the end cover 231 provided by yet other embodiments of the present application. The first bottom wall 2311a exceeds the first outer surface 2313b along the direction facing away from the electrode assembly 22 (refer to FIG. 7), that is, the first outer surface 2313b is closer to the electrode assembly 22 than the first bottom wall 2311a, so that the second concave portion 2311 is recessed to the second convex portion 2314, thereby increasing the recess depth of the second concave portion 2311 and increasing the space of the second concave portion 2311 for accommodating the first convex portion 2332, so that the first convex portion 2332 can extend to a deeper position of the second concave portion 2311. In still other embodiments, the first bottom wall 2311a may also be flush with the first outer surface 2313b.

In some embodiments, continuing to refer to FIGS. 14 and 15, the insulating member 233 includes a second body 2333 and a first convex portion 2332. The second body 2333 has a second inner surface 2333a and a second outer surface 2333b opposite to each other, the second inner surface 2333a faces the electrode assembly 22, the first concave portion 2331 is recessed from the second inner surface 2333a along the direction facing away from the electrode assembly 22, and the first convex portion 2332 is protrudingly provided on the second outer surface 2333b.

Optionally, the second outer surface 2333b abuts against the first inner surface 2313a to eliminate the gap between the second outer surface 2333b and the first inner surface 2313a, so that the first convex portion 2332 may be completely accommodated in the first concave portion 2331 so as to make more space for the electrode assembly 22.

Further, the first convex portion 2332 has a second end surface 2332a, the first convex portion 2332 extends to the second end surface 2333b from the second outer surface 2333b along the direction facing away from the electrode assembly 22. A gap is presented between the second end surface 2332a and the first bottom wall 2311a to ensure that the second outer surface 2333b of the second body 2333 may effectively abut against the first inner surface 2313a of the first body 2313, which reduces a risk of over-positioning between the insulating member 233 and the end cover 231.

Optionally, the first concave portion 2331 has a second bottom wall 2331a, the first concave portion 2331 is recessed to the second bottom wall 2331a from the second inner surface 2333a along the direction facing away from the electrode assembly 22, the second bottom wall 2331a of the first concave portion 2331 exceeds the second outer surface 2333b in the direction facing away from the electrode assembly 22, so that the first concave portion 2331 is recessed to the first convex portion 2332, thereby increasing the recess depth of the first concave portion 2331 and increasing the space of the first concave portion 2331 for accommodating the tab 221 and/or the current collecting member 24, the tab and/or the current collecting member can be extended to a deeper position of the first concave portion, so as to make more space for the electrode assembly 22.

It can be seen from the above embodiment that the second concave portion 2311 on the end cover 231 can be formed by an inner surface of the first body 2313 being recessed along the direction facing away from the electrode assembly 22. Of course, the second concave portion 2311 on the end cover 231 can also have other forms.

Figure 16:
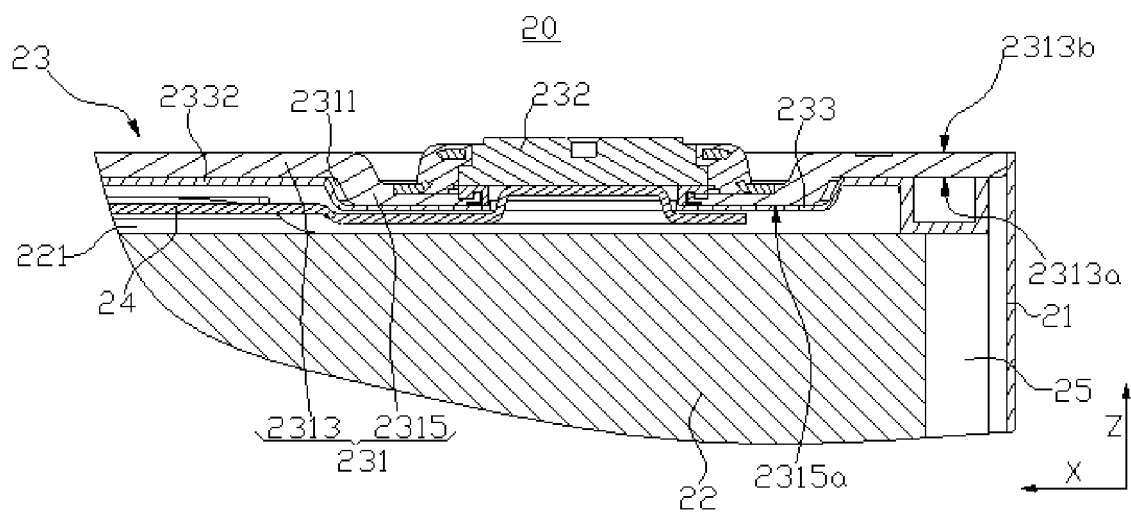
FIG. 16 is a partially enlarged view of a battery cell provided by still other embodiments of the present application.

In some embodiments, please refer to FIG. 16, FIG. 16 is a partially enlarged view of the battery cell 20 provided by still other embodiments of the present application. The end cover 231 includes a first body 2313 and a third convex portion 2315, where the first body 2313 is used to cover the opening of the housing 21. The first body 2313 has a first inner surface 2313a facing the electrode assembly 22, the third convex portion 2315 has a third end surface 2315a, and the third convex portion 2315 extends to the third end surface 2315a from the first inner surface 2313a along the direction facing the electrode assembly 22. The second concave portion 2311 is recessed to the first inner surface 2313a from the third end surface 2315a along the direction facing away from the electrode assembly 22. That is, by providing the third convex portion 2315 on the first inner surface 2313a of the first body 2313, the end cover 231 forms the second concave portion 2311 on the side facing the electrode assembly 22.

Taking two electrode terminals 232 of the end cover assembly 23 as an example, two third convex portions 2315 may be protrudingly provided on the first inner surface 2313a of the first body 2313, where one third convex portion 2315 corresponds to one electrode terminal 232. The second concave portion 2311 is formed between the two third convex portions 2315.

Figure 17:
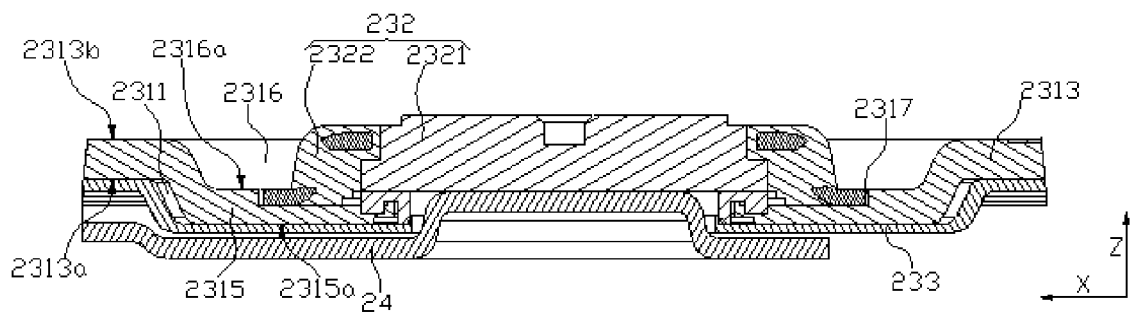
FIG. 17 is a partially enlarged view of the battery cell shown in FIG. 16.

In some embodiments, please refer to FIG. 17, FIG. 17 is a partially enlarged view of the battery cell 20 shown in FIG. 16. The first body 2313 also has a first outer surface 2313b disposed opposite to the first inner surface 2313a, a third concave portion 2316 recessed from the first outer surface 2313b along the direction facing the electrode assembly 22 is formed on one side of the first body 2313 facing away from the electrode assembly 22 at a position corresponding to the third convex portion 2315, and the third concave portion 2316 is configured to accommodate at least a part of the electrode terminal 232.

The third concave portion 2316 may be used to accommodate at least a part of the electrode terminal 232, so as to shorten the length of the part of the electrode terminal 232 protruding from the first body 2313. In addition, since the third concave portion 2316 is arranged at the position of the first body 2313 corresponding to the third convex portion 2315, the third convex portion 2315 can make the third concave portion 2316 recess as much as possible along the direction facing the electrode assembly 22, which further shortens the length of the part of the electrode terminal 232 protruding from the first body 2313.

Where, the electrode terminal 232 is mounted at the bottom of the third concave portion 2316 so that at least a part of the electrode terminal 232 is accommodated in the third concave portion 2316.

Optionally, the third concave portion 2316 has a third bottom wall 2316a, the third concave portion 2316 is recessed to the third bottom wall 2316a from the first outer surface 2313b along the direction facing the electrode assembly 22; and the third bottom wall 2316a exceeds the first inner surface 2313a along the direction facing the electrode assembly 22. This structure makes the third concave portion 2316 recessed into the third convex portion 2315, thereby increasing the recess depth of the third concave portion 2316, increasing the space of the third concave portion 2316 for accommodating the electrode terminal 232, so that the electrode terminal 232 may be mounted at a deeper position of the third concave portion 2316.

Exemplarily, a fourth concave portion 2317 is provided on the third bottom wall 2316a of the third concave portion 2316, the electrode terminal 232 partially extends to the fourth concave portion 2317, and the part of the electrode terminal 232 extending to the fourth concave portion 2317 abuts against a bottom wall of the fourth concave portion 2317, so as to mount the electrode terminal 232 to the end cover 231.

Taking the electrode terminal 232 including the terminal main body 2321 and the connection body 2322 as an example, the connection body 2322 of the electrode terminal 232 partially extends to the fourth concave portion 2317, and the part of the connection body 2322 extending to the fourth concave portion 2317 abuts against the bottom wall of the fourth concave portion 2317, and the connection body 2322 and the end cover 231 may be welded and fixed.

Figure 18:
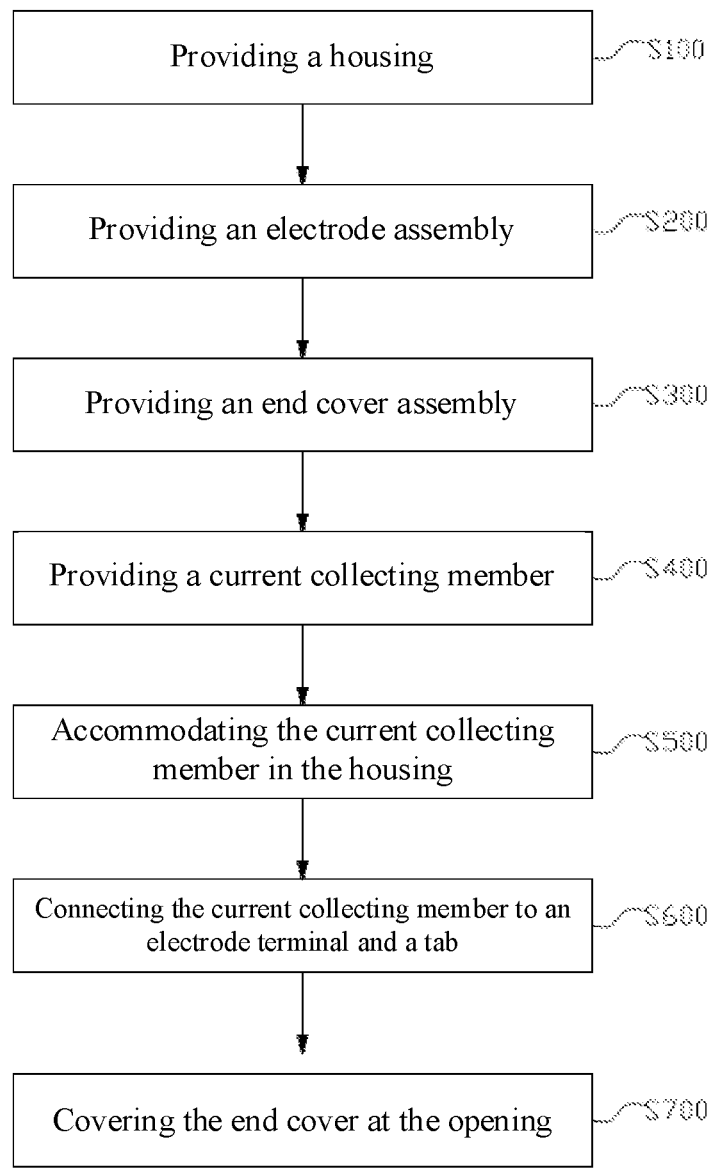
FIG. 18 is a flowchart of a manufacturing method for a battery cell provided by some embodiments of the present application.

Please refer to FIG. 18, FIG. 18 is a flowchart of a manufacturing method for the battery cell 20 provided by some embodiments of the present application. The method includes:

S100: providing a housing 21, the housing 21 having an opening;

S200: providing an electrode assembly 22, the electrode assembly 22 including a tab 221;

S300: providing an end cover assembly 23, the end cover assembly 23 including an end cover 231, an electrode terminal 232 and an insulating member 233, the electrode terminal 232 being mounted to the end cover 231;

S400: providing a current collecting member 24;

S500: accommodating the electrode assembly 22 in the housing 21;

S600: connecting the current collecting member 24 to the electrode terminal 232 and the tab 221, so that the tab 221 is electrically connected to the electrode terminal 232;

S700: covering the end cover 231 at the opening;

where the insulating member 233 is located on one side of the end cover 231 facing the electrode assembly 22, a first concave portion 2331 is formed on one side of the insulating member 233 facing the electrode assembly 22, and the first concave portion 2331 is configured to accommodate at least a part of the tab 221 and/or at least a part of the current collecting member 24, a first convex portion 2332 is formed on one side of the insulating member 233 facing away from the electrode assembly 22 at a position corresponding to the first concave portion 2331, a second concave portion 2311 is formed on the side of the end cover 231 facing the electrode assembly 22, and the second concave portion 2311 is used to accommodate the first convex portion 2332.

In the above method, the sequence of step S100, step S200, step S300, and step S400 is not limited. For example, step S400 may be performed first, then followed by step S300, step S200, and step S100. In addition, step S600 may be performed before step S500, and step S500 may also be performed after step S600.

For the related structure of the battery cell 20 manufactured by the above method may refer to the battery cell 20 provided in the above respective embodiments.

Figure 19:
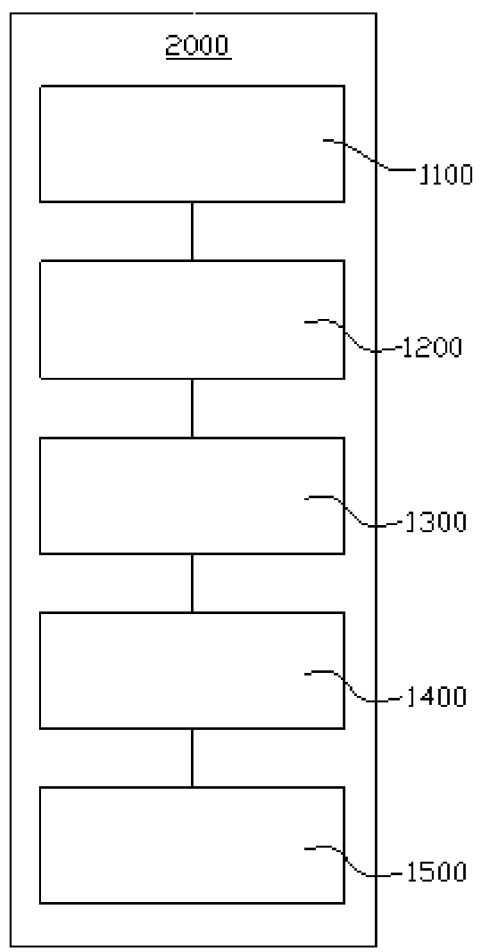
FIG. 19 is a schematic block diagram of a manufacturing device for a battery cell provided by some embodiments of the present application.

Please refer to FIG. 19, FIG. 19 is a schematic block diagram of the manufacturing device 2000 for the battery cell 20 provided by some embodiments of the present application. The manufacturing device 2000 includes a first providing apparatus 1100, a second providing apparatus 1200, a third providing apparatus 1300 and an assembling apparatus 1500.

The first providing apparatus 1100 is used for providing a housing 21, the housing 21 having an opening. The second providing apparatus 1200 is used for providing an electrode assembly 22, and the electrode assembly 22 includes a tab 221. The third providing apparatus 1300 is used for providing an end cover assembly 23, the end cover assembly 23 includes an end cover 231 an electrode terminal 232 and an insulating member 233, and the electrode terminal 232 is mounted to the end cover 231. The fourth providing apparatus 1400 is used for providing a current collecting member 24. The assembling apparatus 1500 is used for accommodating the electrode assembly 22 in the housing 21, and the assembling apparatus 1500 is used for connecting the current collecting member 24 to the electrode terminal 232 and the tab 221 so that the tab 221 is electrically connected to the electrode terminal 232. The assembling apparatus 1500 is further used to cover the end cover 231 at the opening.

Where, the insulating member 233 is located on the side of the end cover 231 facing the electrode assembly 22, a first concave portion 2331 is formed on the side of the insulating member 233 facing the electrode assembly 22, and the first concave portion 2331 is configured to accommodate the at least a part of the tab 221 and/or the at least a part of the current collecting member 24, a first convex portion 2332 is formed on the side of the insulating member 233 facing away from the electrode assembly 22 at the position corresponding to the first concave portion 2331, a second concave portion 2311 is formed on the side of the end cover 231 facing the electrode assembly 22, and the second concave portion 2311 is used to accommodate the first convex portion 2332.

For the related structure of the battery cell 20 manufactured by the above manufacturing device may refer to the battery cell 20 provided in the above respective embodiments.

It should be noted that, the embodiments in the present application and features in the embodiments may be mutually combined provided that no conflict is caused.

The above embodiments are merely used to illustrate the technical solution of the present application, but are not intended to limit the present application. For those skilled in the art, the present application may have various amendments and modifications. Any modification, equivalent replacement, or improvement made without departing from the spirit and principle of the present application shall fall within the protection scope of the present application.

What is claimed is:

1. A battery cell, comprising:
   a housing, with an opening;
   an electrode assembly, being accommodated in the housing, the electrode assembly comprising a tab;
   an end cover assembly, comprising an end cover, an electrode terminal and an insulating member, the end cover being used to cover at the opening, the electrode terminal being mounted to the end cover, the insulating member located on one side of the end cover facing the electrode assembly; and
   a current collecting member, for connecting the electrode terminal and the tab, so that the tab is electrically connected to the electrode terminal;
   wherein a first concave portion is formed on one side of the insulating member facing the electrode assembly, and the first concave portion is configured to accommodate at least a part of the tab and/or at least a part of the current collecting member, a first convex portion is formed on one side of the insulating member facing away from the electrode assembly at a position corresponding to the first concave portion, a second concave portion is formed on the side of the end cover facing the electrode assembly, and the second concave portion is used for accommodating the first convex portion; and
   wherein the insulating member comprises a second body and the first convex portion; the second body has a second inner surface and a second outer surface opposite to each other, the second inner surface faces the electrode assembly, the first concave portion is recessed from the second inner surface along the direction facing away from the electrode assembly, and the first convex portion is protrudingly provided on the second outer surface.

2. The battery cell according to claim 1, wherein the end cover comprises a first body, the first body being used to cover at the opening;
   the first body has a first inner surface facing the electrode assembly, and the second concave portion is recessed from the first inner surface along a direction facing away from the electrode assembly.

3. The battery cell according to claim 2, wherein the end cover further comprises a second convex portion;
   the first body further has a first outer surface provided opposite to the first inner surface, and the second convex portion is protrudingly provided on the first outer surface and is located at a position corresponding to the second concave portion.

4. The battery cell according to claim 3, wherein the second convex portion has a first end surface, the second convex portion extends to the first end surface from the first outer surface along the direction facing away from the electrode assembly, and the first end surface does not exceed the electrode terminal in the direction facing away from the electrode assembly.

5. The battery cell according to claim 3, wherein the second concave portion has a first bottom wall, the second concave portion is recessed to the first bottom wall from the first inner surface along the direction facing away from the electrode assembly, and the first bottom wall exceeds the first outer surface along the direction facing away from the electrode assembly.

6. The battery cell according to claim 1, wherein the second outer surface abuts against the first inner surface.

7. The battery cell according to claim 1, wherein the first convex portion has a second end surface, the first convex portion extends to the second end surface from the second outer surface along the direction facing away from the electrode assembly;

the second concave portion has a first bottom wall, the second concave portion is recessed to the first bottom wall from the first inner surface along the direction facing away from the electrode assembly;

wherein a gap is presented between the second end surface and the first bottom wall.

8. The battery cell according to claim 1, wherein the first concave portion has a second bottom wall, the first concave portion is recessed to the second bottom wall from the second inner surface along the direction facing away from the electrode assembly, and the second bottom wall exceeds the second outer surface along the direction facing away from the electrode assembly.

9. The battery cell according to claim 1, wherein the end cover comprises a first body and a third convex portion, the first body being used to cover at the opening;

the first body has a first inner surface facing the electrode assembly, the third convex portion has a third end surface, and the third convex portion extends to the third end surface from the first inner surface along a direction facing the electrode assembly; and the second concave portion is recessed to the first inner surface from the third end surface along the direction facing away from the electrode assembly.

10. The battery cell according to claim 9, wherein the first body further has a first outer surface provided opposite to the first inner surface;

a third concave portion recessed from the first outer surface along the direction facing the electrode assembly is formed on one side of the first body facing away from the electrode assembly at a position corresponding to the third convex portion, the third concave portion is configured to accommodate at least a part of the electrode terminal.

11. The battery cell according to claim 10, wherein the third concave portion has a third bottom wall, the third concave portion is recessed to the third bottom wall from the first outer surface along the direction facing the electrode assembly; and the third bottom wall exceeds the first inner surface along the direction facing the electrode assembly.

12. The battery cell according to claim 1, wherein the first convex portion and the second concave portion form a positioning engagement.

13. The battery cell according to claim 1, wherein the electrode assembly abuts against the insulating member along the direction facing away from the electrode assembly.

14. The battery cell according to claim 1, wherein the tab comprises a first connection portion, the current collecting member comprises a second connection portion for connecting to the first connection portion; and the first concave portion is configured to accommodate at least a part of the first connection portion and/or at least a part of the second connection portion.

15. The battery cell according to claim 14, wherein the first connection portion and the second connection portion are laminated and distributed in a thickness direction of the end cover.

16. The battery cell according to claim 14, wherein the first connection portion and the second connection portion are both accommodated in the first concave portion.

17. The battery cell according to claim 14, wherein the current collecting member further comprises a third connection portion for connecting to the electrode terminal, and the third connection portion and the second connection portion are spaced part in the thickness direction of the end cover.

18. A battery, comprising a box body and a battery cell, wherein the battery cell comprises:

a housing, with an opening;

an electrode assembly, being accommodated in the housing, the electrode assembly comprising a tab;

an end cover assembly, comprising an end cover, an electrode terminal and an insulating member, the end cover being used to cover at the opening, the electrode terminal being mounted to the end cover, the insulating member located on one side of the end cover facing the electrode assembly; and a current collecting member, for connecting the electrode terminal and the tab, so that the tab is electrically connected to the electrode terminal;

wherein a first concave portion is formed on one side of the insulating member facing the electrode assembly, and the first concave portion is configured to accommodate at least a part of the tab and/or at least a part of the current collecting member, a first convex portion is formed on one side of the insulating member facing away from the electrode assembly at a position corresponding to the first concave portion, a second concave portion is formed on the side of the end cover facing the electrode assembly, and the second concave portion is used for accommodating the first convex portion; and wherein the insulating member comprises a second body and the first convex portion; the second body has a second inner surface and a second outer surface opposite to each other, the second inner surface faces the electrode assembly, the first concave portion is recessed from the second inner surface along the direction facing away from the electrode assembly, and the first convex portion is protrudingly provided on the second outer surface; and the battery cell being accommodated in the box body.

19. A power consumption device, comprising a battery comprising a box body and a battery cell, wherein the battery cell comprises:

a housing, with an opening;

an electrode assembly, being accommodated in the housing, the electrode assembly comprising a tab;

an end cover assembly, comprising an end cover, an electrode terminal and an insulating member, the end cover being used to cover at the opening, the electrode terminal being mounted to the end cover, the insulating member located on one side of the end cover facing the electrode assembly; and a current collecting member, for connecting the electrode terminal and the tab, so that the tab is electrically connected to the electrode terminal;

wherein a first concave portion is formed on one side of the insulating member facing the electrode assembly, and the first concave portion is configured to accommodate at least a part of the tab and/or at least a part of the current collecting member, a first convex portion is formed on one side of the insulating member facing away from the electrode assembly at a position corresponding to the first concave portion, a second concave portion is formed on the side of the end cover facing the electrode assembly, and the second concave portion is used for accommodating the first convex portion; and wherein the insulating member comprises a second body and the first convex portion; the second body has a second inner surface and a second outer surface opposite to each other, the second inner surface faces the electrode assembly, the first concave portion is recessed from the second inner surface along the direction facing away from the electrode assembly, and the first convex portion is protrudingly provided on the second outer surface; and the battery cell being accommodated in the box body.

* * * * *